(12) United States Patent  
Posner et al.

(10) Patent No.: US 11,568,179 B2  
(45) Date of Patent: Jan. 31, 2023

(54) SELECTING AN ALGORITHM FOR ANALYZING A DATA SET BASED ON THE DISTRIBUTION OF THE DATA SET

(71) Applicant: Oracle International Corporation, Redwood Shores, CA (US)

(72) Inventors: Joseph Marc Posner, Oakland, CA (US); Sunil Kumar Kunisetty, Fremont, CA (US); Mohan Kamath, Fremont, CA (US); Nickolas Kavantzas, Emerald Hills, CA (US); Sachin Bhatkar, Sunnyvale, CA (US); Sergey Troshin, Santa Clara, CA (US); Sujay Sarkhel, San Jose, CA (US); Shivakumar Subramanian Govindarajapuram, Dublin, CA (US); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 880 days.

(21) Appl. No.: 16/438,969

(22) Filed: Jun. 12, 2019

(65) Prior Publication Data

US 2020/0125900 A1 Apr. 23, 2020

Related U.S. Application Data

(60) Provisional application No. 62/748,374, filed on Oct. 19, 2018.

(51) Int. Cl.
*G06N 20/00* (2019.01)
*G06F 16/00* (2019.01)
(Continued)

(52) U.S. Cl.
CPC ....... *G06K 9/6265* (2013.01); *G06F 16/5866* (2019.01); *G06F 16/9537* (2019.01); (Continued)

(58) Field of Classification Search
CPC .. G06K 9/6265; G06K 9/6231; G06K 9/6257; G06N 20/00; G06N 5/02; (Continued)

(56) References Cited

U.S. PATENT DOCUMENTS 5,450,595 A 9/1995 Chen et al.
6,999,268 B2 2/2006 Hoerger
(Continued)

FOREIGN PATENT DOCUMENTS

CN 110389725 A 10/2019
WO 2011/002777 A2 1/2011
(Continued)

OTHER PUBLICATIONS

Takahiro Shinozaki et al., "Gaussian Mixture Optimization Based on Efficient Cross-Validation", IEEE Journal of Selected Topics in Signal Processing, vol. 4, Issue: 3, Jun. 2010, pp. 540-547.*

(Continued)

*Primary Examiner* — Srirama Channavajjala
(74) *Attorney, Agent, or Firm* — Invoke (57) ABSTRACT

A model analyzer may receive a representative data set as input and select one of a plurality of analytic models to perform the analysis. Before deciding which model to use the model may be trained, and the trained model evaluated for accuracy. However, some models are known to behave poorly when the training data is distributed in a particular way. Thus, the cost of training a model and evaluating the trained model can be avoided by first analyzing the distribution of the representative data. Identifying the representative data distribution allows ruling out use of models for (Continued)

which the distribution of the representative data is unsuitable. Only models that may be compatible with the distribution of the representative data may be trained and evaluated for accuracy. The most accurate trained model whose accuracy meets an accuracy threshold may be selected to analyze subsequently received data related to the representative data.

16 Claims, 7 Drawing Sheets

(51) Int. Cl.
- G06K 9/62 (2022.01)
- G06F 16/9537 (2019.01)
- G06F 16/957 (2019.01)
- G06F 16/58 (2019.01)
- G06N 5/04 (2006.01)
- G06N 5/02 (2006.01)

(52) U.S. Cl.
CPC ....... *G06F 16/9574* (2019.01); *G06K 9/6231* (2013.01); *G06K 9/6257* (2013.01); *G06N 5/025* (2013.01); *G06N 5/048* (2013.01); *G06N 20/00* (2019.01)

(58) Field of Classification Search
CPC .... G06N 5/025; G06N 5/048; G06F 16/9537; G06F 16/9574; G06F 16/5866; G06F 16/444; G06F 16/35; G06F 16/56
See application file for complete search history.

(56) References Cited

U.S. PATENT DOCUMENTS

| | | | |
|---|---|---|---|
| 8,145,842 B2 | 3/2012 | Shiga | |
| 8,291,131 B2 | 10/2012 | Jeddeloh | |
| 8,296,257 B1* | 10/2012 | Chavira | G06F 16/35 706/62 |
| 8,381,202 B2 | 2/2013 | Papakipos et al. | |
| 8,396,964 B2 | 3/2013 | Barkan et al. | |
| 9,158,970 B2* | 10/2015 | Zhang | G06V 40/172 |
| 9,218,574 B2* | 12/2015 | Phillipps | G06N 20/20 |
| 9,239,986 B2* | 1/2016 | Lin | G06N 20/00 |
| 9,767,109 B2 | 9/2017 | Resch et al. | |
| 10,223,565 B2 | 3/2019 | Yeakley et al. | |
| 10,380,458 B2* | 8/2019 | Merhav | G06K 9/6277 |
| 10,402,748 B2 | 9/2019 | Virkar et al. | |
| 10,768,798 B1 | 9/2020 | Porath et al. | |
| 10,853,343 B2 | 12/2020 | Muehle et al. | |
| 10,911,470 B2* | 2/2021 | Muddu | G06F 16/444 |
| 11,153,349 B2* | 10/2021 | Ng | G06Q 30/012 |
| 2008/0154821 A1* | 6/2008 | Poulin | G06Q 10/0631 706/21 |
| 2009/0228499 A1 | 9/2009 | Schmidtler et al. | |
| 2010/0211737 A1 | 8/2010 | Flynn et al. | |
| 2012/0191630 A1* | 7/2012 | Breckenridge | G06N 20/00 706/12 |
| 2012/0303558 A1* | 11/2012 | Jaiswal | G06N 20/00 706/12 |
| 2013/0085773 A1* | 4/2013 | Yao | G16H 50/20 705/2 |
| 2013/0290631 A1 | 10/2013 | Lionei et al. | |
| 2014/0068183 A1 | 3/2014 | Joshi et al. | |
| 2014/0101090 A1* | 4/2014 | Gordon | G06N 5/048 706/52 |
| 2015/0193698 A1 | 7/2015 | Nakamura et al. | |
| 2015/0254555 A1* | 9/2015 | Williams, Jr | G06N 3/084 706/14 |
| 2015/0293945 A1 | 10/2015 | Amrhein et al. | |
| 2017/0063908 A1* | 3/2017 | Muddu | H04L 43/062 |
| 2017/0272336 A1 | 9/2017 | Johnstone et al. | |
| 2017/0351602 A1 | 12/2017 | Oshimi et al. | |
| 2018/0004783 A1 | 1/2018 | Mehrotra et al. | |
| 2018/0018587 A1 | 1/2018 | Kobayashi et al. | |
| 2018/0018590 A1* | 1/2018 | Szeto | G16H 40/20 |
| 2018/0150728 A1* | 5/2018 | Vahdat | G06N 3/0472 |
| 2018/0253467 A1 | 9/2018 | Gurajada et al. | |
| 2019/0095109 A1 | 3/2019 | Zhou | |
| 2019/0147371 A1* | 5/2019 | Deo | G06N 20/20 706/12 |
| 2019/0375416 A1* | 12/2019 | Rau | G06N 20/20 |

FOREIGN PATENT DOCUMENTS

| | | |
|---|---|---|
| WO | 2011/106394 A2 | 9/2011 |
| WO | WO2012103290 A1 * | 8/2012 |
| WO | 2014/013527 A1 | 1/2014 |
| WO | 2014/036307 A1 | 3/2014 |
| WO | WO2014126612 A1 * | 8/2014 |
| WO | WO2017034820 A1 * | 3/2017 |
| WO | WO2017132572 A1 * | 8/2017 |
| WO | WO2019172868 A1 * | 9/2019 |

OTHER PUBLICATIONS

Jing Peng, et al., "A Concept Similarity Based Text Classification Algorithm", Fourth International Conference on Fuzzy Systems and Knowledge Discovery (FSKD 2007), Aug. 2007, pp. 1-5.*

Di Wu et al., "A Joint Model for Sentence Semantic Similarity Learning", 2017 13th International Conference on Semantics, Knowledge and Grids (SKG), Aug. 2017, pp. 120-125.*

Yi Wan et al., "Study on Parameter Distribution in Structure Reliability Analysis: Machine Learning Algorithm and Application", 2009 Second International Workshop on Knowledge Discovery and Data Mining, Jan. 2009, pp. 833-836.*

Yang You et al., "Runtime Data Layout Scheduling for Machine Learning Dataset", 2017 46th International Conference on Parallel Processing (ICPP), Sep. 2017, pp. 452-461.

Nico Kruber et al., "A relational database schema on the transactional key-value store scalaris", IEEE International Conference on Big Data (Big Data), Oct. 2014, pp. 29-37.

* cited by examiner

Training data set {100, 95, 106, 130, 125, 120, 92, 97, 102, 140, 107, 99, 123, 90, 110, 100, 100, 113, 115, 99} — 510

Random distribution model: 5 buckets

Training set distribution:
{90-100: 9} {101-110: 4} {111-120:3} {121-130:3} {131-140: 1}
=> {9, 4, 3, 3, 1}

Random Distribution representation: (between 90 and 140}
{90-100: 4} {101-110: 4} {111-120:4} {121-130:4} {131-140: 4}
=> {4, 4, 4, 4, 4}
                              Similarity score: 6

— 520

Gaussian distribution model: 5 buckets

Training set distribution:
{71-85:0} {85-99:6} {100-114:7} {115-129:4} {130-144: 2}
{0,6,7,4,2}

Gaussian Distribution representation: mean=108
{71-85: 0} {85-99: 3} {100-114:14} {115-129:3} {130-144: 0}
{0,3,14,2,0}

Similarity score: 8

SELECTING AN ALGORITHM FOR ANALYZING A DATA SET BASED ON THE DISTRIBUTION OF THE DATA SET

INCORPORATION BY REFERENCE

This application claims the benefit of U.S. Provisional Patent Application 62/748,374, filed on Oct. 19, 2018, which is hereby incorporated by reference.

TECHNICAL FIELD

The present disclosure relates to data analytics. In particular, the application relates to various techniques to optimize data analytics.

BACKGROUND

A data set may be analyzed for a variety of reasons including for detection of anomalies. Anomaly detection is useful for many practical applications such as network intrusion detection, fraud detection, and abnormal species detection in the life sciences domain. Examples herein refer to anomaly detection, however, embodiments are equally applicable to other types of data analysis. Different types of anomaly detection algorithms are suitable for different types of data sets. For any given data set, one algorithm may be better for anomaly detection than another algorithm. As an example, for a given data set, one algorithm may have a higher Recall score or a higher Precision score than another algorithm.

Conventional methods for algorithm selection involve execution of a particular algorithm on a portion of a data set to determine a set of results. The set of results are evaluated to determine a performance of the particular algorithm. If the performance of the particular algorithm meets a criterion and/or if the performance of the particular algorithm is better than performance of other algorithms, then the particular algorithm is used for analyzing the complete data set. However, executing each algorithm on a partial data set, prior to execution on the entire data set, may be time consuming and/or ineffective. Furthermore, an algorithm's performance on a partial data set may not match the algorithm's performance on the complete data set due to difference in characteristics of the partial data set and the complete data set.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW

As described above, a data set may be analyzed for a variety of reasons, including analysis for detection of anomalies. Some analytic models, used for analysis of data sets, may be machine learning models that require training on a sample data set. Other analytic models may use statistical analysis with different precomputation requirements. Data with a certain distribution may be suitable for analysis by one machine learning model, but not suitable for analysis by another machine learning model.

One or more embodiments select analytic model(s), of a set of analytic models, that are suitable for analyzing a data set based at least on a distribution of the data set. A set of machine learning models may be chosen from a set of potential machine learning models. The chosen machine learning models may be trained on the representative data set, whereas the potential machine learning models that are not chosen may not be trained. Choosing a machine learning model to train includes verifying that the representative data set does not exhibit a distribution pattern for which the model is known to be inaccurate. If none of the potential machine learning models can be verified as compatible with distribution of the representative data set, the simplest and least desirable theoretical model may be selected by default. The default theoretical model may not require training.

After a machine-learning model, that is chosen for training, is trained on the training data set, the trained model is evaluated with respect to accuracy. Among the trained models, the model that meets a threshold level of accuracy and/or generates the most accurate analysis may be used for analysis of a target data set.

Some embodiments described in this Specification and/or recited in the claims may not be included in this General Overview section.

2. ANALYTIC MODEL SELECTION ARCHITECTURE

Figure 1:
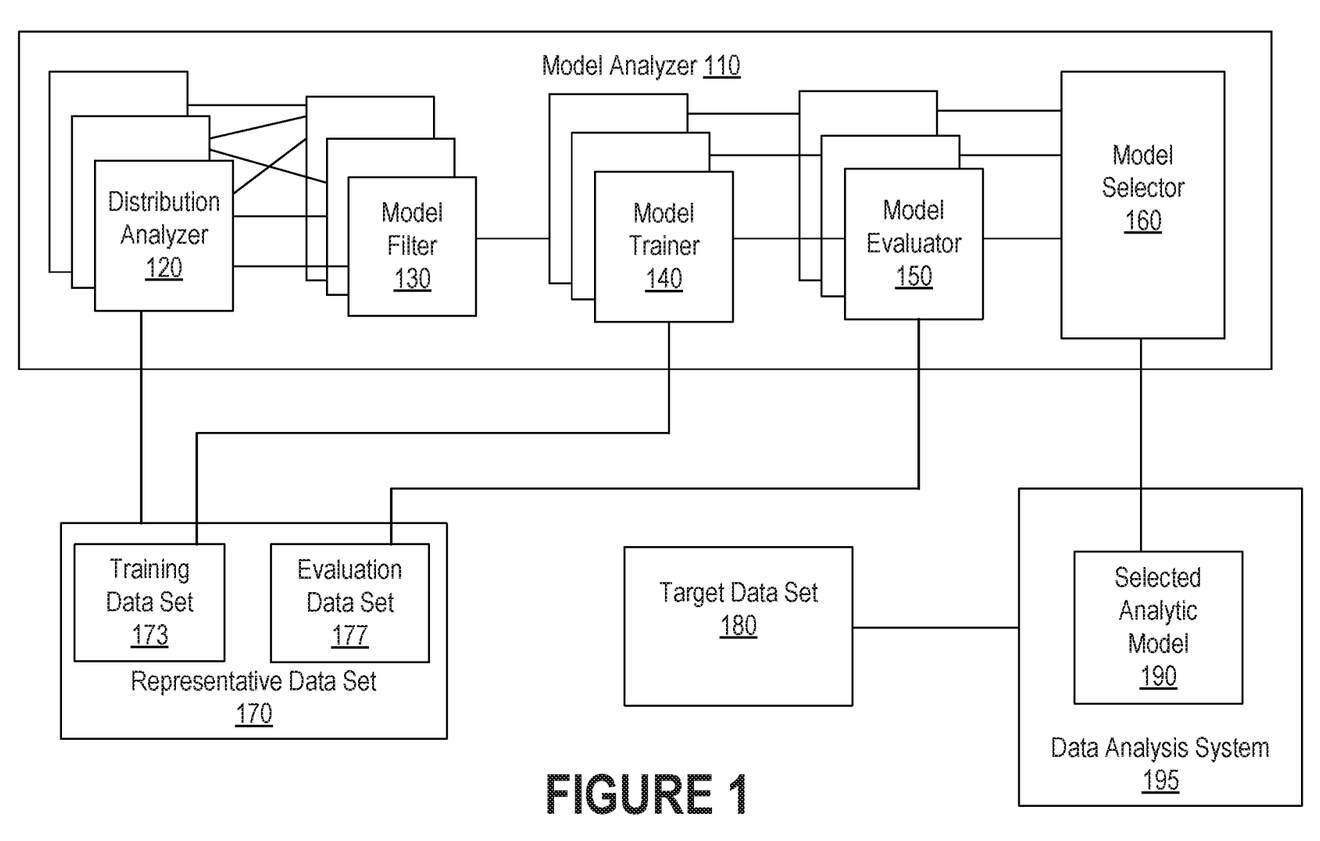
FIG. 1 is a block diagram that illustrates components of a system for selecting an analytic model based on a distribution type of a data set, in accordance with one or more embodiments.

FIG. 1 is a block diagram that illustrates components of a system for selecting an analytic model based on a distribution type of a data set, in accordance with one or more embodiments. Components may be added, removed, modified, or combined. Functionality described in relation to one component may instead be implemented by another component. Accordingly, the specific components illustrated and/or described herein should not be construed as limiting the scope of any of the claims.

Representative Data Set 170 is user data that is representative of data that the user may request to be analyzed in the future. Representative data set 170 may be used to select an analytic model for analyzing subsequent target data that has a distribution similar to the distribution of the representative data. The distribution of the representative data set may not necessarily be known at the time that the representative data set is received. Each of Training Data Set 173 and Evaluation Data Set 177 is a portion of representative data set 170. Training data set 173 may be used to train a machine learning model, and the trained model may be evaluated for accuracy using Evaluation data set 177.

Representative data set 170 is input to Model Analyzer 110. Model analyzer 110 has components Distribution Analyzer 120, Model Filter 130, Model Trainer 140, Model Evaluator 150, and Model Selector 160.

Some analytic models are known to perform poorly when trained using data having certain distribution patterns. If the distribution properties of the representative data are very similar to distributions for which a model is known to perform poorly, the model may not be selected, and the expensive process of training such a model can be avoided Distribution analyzer 120 determines whether the distribution of the representative data set is similar to a set of pre-defined distribution types. The distribution analyzer compares the distribution of the representative data set to each of the defined distribution types. In an embodiment, a distribution may be conceptualized as a set of labelled buckets, each bucket labeled with a range of values and associated with a count of values that belong in the bucket. Table 1 provides an illustration for an example distribution of a representative data set according to a distribution type that partitions the representative data set values into 5 buckets in which the size of the range of values is the same for all buckets. For a representative data set {1,3,2,6,2,8} in which all values are between 1 and 10, each of the 5 buckets may have a range of 2 values. The "range of values" column in Table 1 shows an example of the range of values assigned to each of the 5 buckets. The representative data values assigned to each bucket are shown in the "representative data values" column of Table 1. The count of the number of values assigned to each bucket appears in the "count of data values" column of Table 1.

TABLE 1

| Bucket number | Range of values | Representative data values | Count of data values |
| --- | --- | --- | --- |
| 1 | 1, 2 | 1, 2, 2 | 3 |
| 2 | 3, 4 | 3 | 1 |
| 3 | 5, 6 | 6 | 1 |
| 4 | 7, 8 | 8 | 1 |
| 5 | 9, 10 | none | 0 |

A different distribution type may partition the data based on 4 buckets with certain buckets having a wider range of values than other buckets. The number of buckets may be different across distribution types. For each distribution type, the distribution analyzer creates a representation of the representative data set distribution, placing each value of the representative data set into a bucket defined by the distribution type and counting the values assigned to each bucket. The distribution analyzer also creates a representation of distribution that represents the distribution type using the selected buckets and range values that were defined based on the representative data. The idealized distribution representation is compared with the representative data set distribution representation.

In an embodiment, a distribution representation may be expressed as a vector. For example, for the distribution illustrated in Table 1, each element of the vector may represent a bucket, and the value of each vector element is the count of data values in that bucket. For example: {3, 1, 1, 1, 0} may be a vector representation of the representative data distribution for the random distribution type of Table 1. An idealized random distribution of this representative data may be represented as a vector {1, 1, 2, 1, 1}. A distance measure between the representative data set distribution vector and the idealized distribution type vector may be used to determine to what extent the representative data set matches the distribution type. The distance measure may be compared to a threshold value to determine whether the distribution of the representative data set is similar to the distribution type.

The set of distribution types against which a representative data set may be evaluated may be chosen in a variety of ways. For example, the set of distribution types may be hard-coded, i.e., the same set of distribution types may be selected for evaluating a match for any received data set. Alternatively, the set of distribution types may be selected based on some characteristics of the data set (e.g., data source, data input methodology). As an example, data from a particular source may be known to never include any data with a Gaussian distribution. Alternatively, or additionally, metadata provided with the data set may indicate that the data does not include a Gaussian distribution. The set of distribution types for testing a match with the data set may be selected subsequent to determining that the representative data set includes a minimum number of data points. If the data set does not include a minimum number of data points, then the distribution of the representative data set may not compared against certain distribution types that require the minimum number of data points. Alternatively, if the data set does not include the minimum number of data points, then the algorithm selection process may be terminated entirely.

Figure 4:
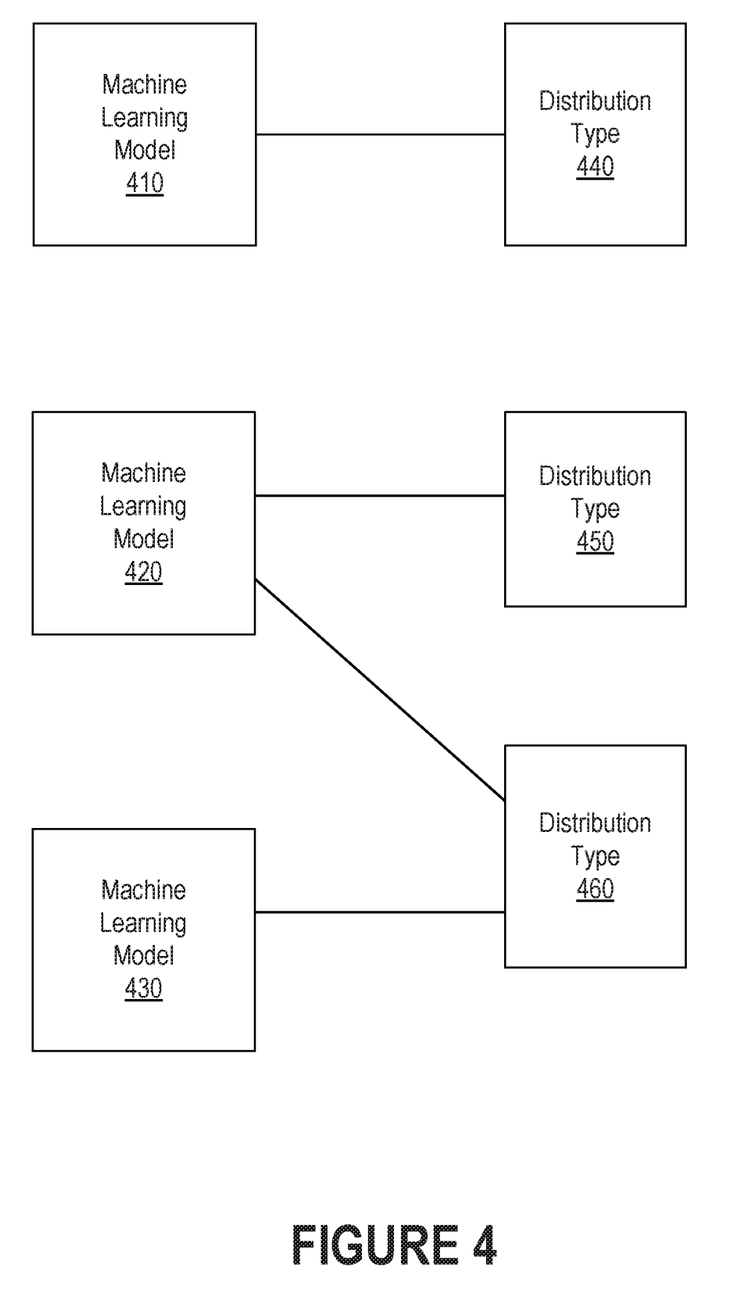
FIG. 4 is a block diagram illustrating example relationships between machine learning models and unsuitable distribution types, in accordance with one or more embodiments.

Model Filter 130 receives from distribution analyzer 120 a set of distribution types that matched the representative data. Model filter 130 has access to the associations between the set of machine learning models from which to choose and the set of distribution types that are unsuitable for use with the model, such as illustrated in FIG. 4.

For each of the matching distribution types, models that are unsuitable for that distribution type are removed from consideration. That is, a machine learning model will not be a candidate for selection if the representative data set is sufficiently similar to a distribution type that is not suitable for the model. The models that are not eliminated from consideration are provided as potential candidates to Model Trainer 140.

Model Trainer 140 trains each of the machine learning model candidates using training data set 173. In an embodiment, the same training data set may be used to train all of the candidate models. The model trainer provides each of the trained models to Model Evaluator 150.

To evaluate the accuracy of each trained model received from the model trainer, Model Evaluator 150 may use evaluation data set 177 that does not overlap the training data used to train the model. The model evaluator assigns accuracy scores to each of the trained models.

Model Selector 160 compares the accuracy of the models against each other based on their accuracy scores. The model selector also may also compare one or more model's accuracy score against an absolute accuracy threshold. If the model having the best accuracy score among all the trained models has an accuracy that meets an accuracy threshold, this most accurate trained model may be selected as the Selected Analytic model 190. The selected trained analytic model is stored for later use. If the best accuracy score among the evaluated trained model does not meet the accuracy threshold, then a default analytic model may be selected instead of one of the trained models.

In an embodiment, the selected analytic model may be associated with an analytic model identifier. The analytic model identifier may identify a particular trained machine model or an untrained analytic model.

Data Analysis System 195 may receive requests for data analysis on Target Data Set 180, which is another user data set that is expected to have similar distribution properties as the representative data set. The data analysis system uses the selected analytic model 190 to accurately analyze target data set 180.

In another embodiment, the analytic model identifier may be returned in response to the request to select an appropriate analytic model. Subsequently, when target data sets are sent for analysis, the analytic model identifier may be included in the request for analysis.

3. SELECTING AN ANALYTIC MODEL

Figure 2A:
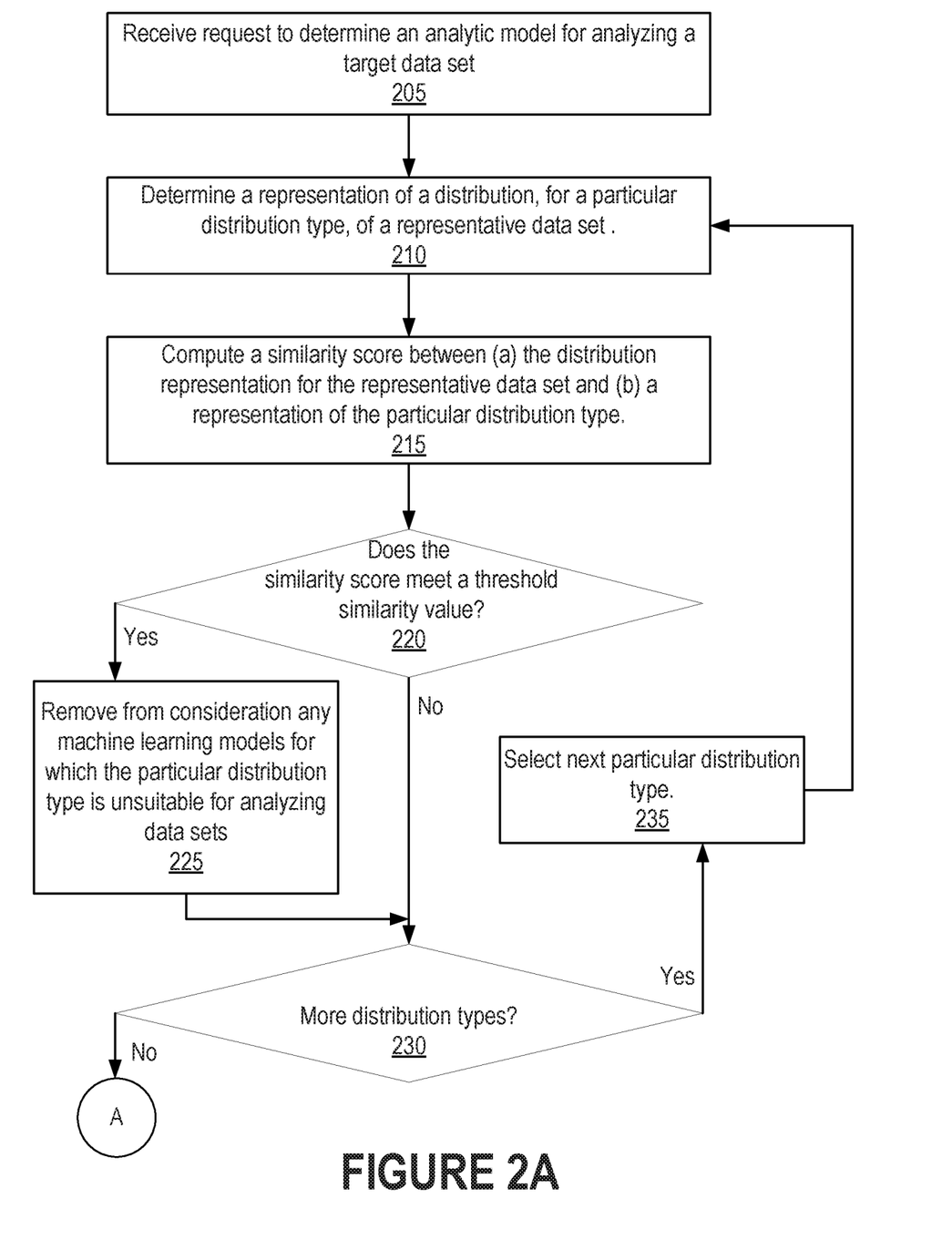
FIGS. 2A and 2B are flow diagrams that together illustrate operations for selecting an analytic model based on a distribution type of a data set, in accordance with one or more embodiments.
Figure 2B:
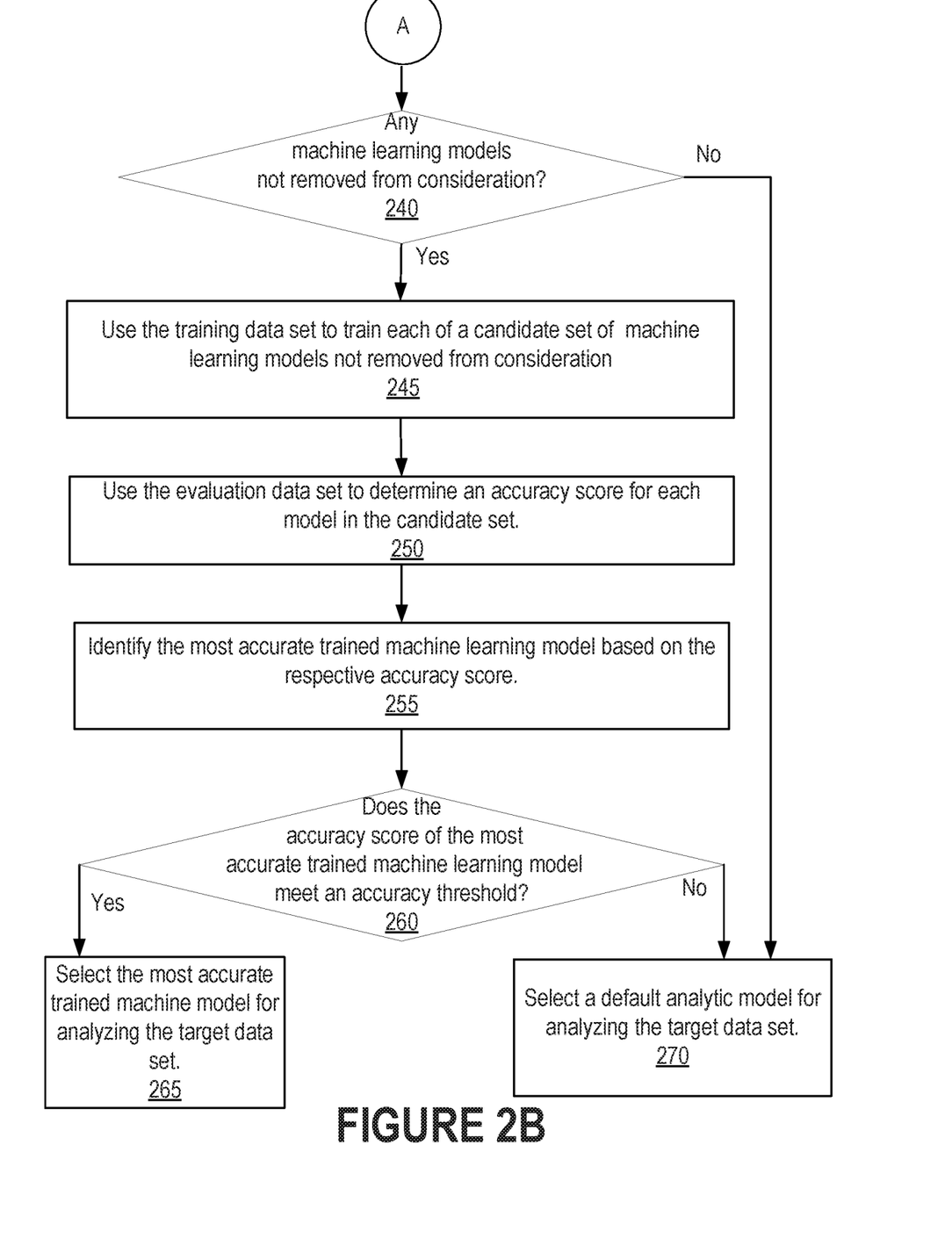

FIGS. 2A and 2B are flow diagrams that together illustrate operations for selecting an analytic model based on a distribution type of a data set, in accordance with one or more embodiments. Operations described herein, with reference to FIGS. 2A and 2B, may be omitted, modified, or rearranged. Operations not illustrated in FIGS. 2A and 2B may be performed instead of or in addition to the illustrated operations. Accordingly, the operations as described herein should not be construed to limit the scope of any of the claims.

In an embodiment, Model Analyzer 110 receives a request to determine an analytic model for analyzing a target data set to be subsequently received. (Operation 205). The request may be received over a network from a computer system that collects sets of data and sends the data to a data analysis service that may comprise the model analyzer running on a server. The request to select an analytic model based on the representative data set may include a set of attribute values that are associated with the representative data. The attributes values may identify or characterize the data in the representative data set in some way. For example, an attribute value may be an identifier of the representative data set as a whole or may indicate the source of the data or characteristics of the data in the data set such as the range of numbers or the number of data points in the set. If the model selected based on the representative data set 170 is a machine learning model, model trainer 140 may use training data set 173 to train the selected machine learning model, and the model evaluator 150 may use evaluation data set 177 to evaluate the accuracy of the trained model.

Distribution analyzer 120 determines a distribution representation for the representative data set according to a distribution type (Operation 210). As explained with respect to Table 1 above, a distribution representation may be expressed as a vector. Each element of the vector may represent a bucket that is assigned a range of values, and the value of each vector element may be the count of data values assigned to the respective bucket. Each distribution type defines a number of buckets into which to partition values in the representative data set as well as a range of values represented by each bucket. In an embodiment, the same number of buckets may be used when analyzing all data sets for the distribution type. In another embodiment, the number of data points in the representative data set may be used to determine the number of buckets defined by a distribution type. To determine a representation of the distribution for a particular distribution type, each value in the representative data set is assigned to one of the buckets defined by the distribution type. For example, a value of 50 may be assigned to a bucket that includes 50 in the range of values assigned to the bucket. Once the values of the representative data set are assigned to buckets, the number of values assigned to each bucket is determined, and a vector is created as described above. In an embodiment, every value is assigned to one and only one bucket. The number of buckets and the range of values for each of the buckets may be different for different distribution types. For that reason, the representation of the representative data set distribution for distribution type may be different from the representation of the representative data set for another distribution type.

Distribution analyzer 120 may also determine an idealized representation of the distribution type for the representative data set. That is, the distribution analyzer may construct a vector for a set of data that is a perfectly distributed according to the distribution type. The vector for the idealized representation (hereinafter "idealized vector") may be formed using the number of buckets and range of values for each bucket defined by the distribution type. The set of data used for constructing the idealized vector may be derived from characteristics of the representative data set. Examples of such characteristics may include a lowest and highest value, a mean value, and the number of values.

The distribution analyzer determines whether a particular distribution type matches the distribution of the representative data. The distribution analyzer computes a similarity score between the representative data vector and the corresponding idealized vector for the particular distribution type (Operation 215). The similarity score may be determined using any way of measuring distance between two vectors. For example, a Euclidian distance function may be used to assess distance/similarity between the two vectors. A distance function outputs a similarity score that represents the distance/similarity of the two vectors.

The similarity score for the distribution type is compared against a similarity threshold (Operation 220). The representative data set is considered to match the distribution type if the similarity score meets the similarity threshold. In an embodiment, a high value for a similarity score may indicate a match, whereas a low value may not. That is, a high similarity score may indicate great similarity. Alternatively, a distance score may be used. A low distance score may indicate little distance, which may indicate a match.

If the representative data set matches the distribution type, then model filter 130 identifies any machine learning models that have been recorded as unsuitable for analyzing data matching the distribution type. The unsuitable machine learning models are removed from consideration (Operation 225). The unsuitable machine learning models may not be selected as the analytic model for analyzing target data sets that are related to the representative data set.

If the representative data set does not match the distribution type, the distribution type is not used for removing models from consideration. In an example, a machine training model X may be unsuitable for data that matches distribution type A and unsuitable for data that matches distribution type B. If the representative data matches even one of distribution type A or distribution type B, then machine learning model X will be removed from consideration for analyzing the representative data and associated target data sets.

If there are more distribution types to evaluate (Operation 230), another distribution type is selected for evaluation (Operation 235), and the process repeats starting at Operation 210. When all the distribution types have been evaluated, the process continues (A connector A) with the operations illustrated in FIG. 2B.

In an embodiment, the system compares the representative data set to a single distribution type at a time and iterates through the distribution types. However, multiple distribution types may be compared against the representative data set distribution concurrently.

Model trainer 140 determines whether there are any machine learning models that are still candidates for selection; that is, that have not been eliminated from consideration (Operation 240). If there are no machine learning models left in the candidate set, then a default analytic model may be selected (Operation 270). The default analytic model may not require training. If there is at least one machine learning model in the candidate set, then model trainer 140 may train each machine learning model in the candidate set using the training data set (Operation 245). Many different kinds of machine learning models may be used. There may be tens of thousands of different regression models. Any means of training a machine-learning model on a training data set may be used. Machine learning involves using statistical methods to analyze data points in a training data set to construct a mathematical model.

Model evaluator 150 evaluates the accuracy of each of the trained models using the evaluation data set (Operation 250). The evaluation data set includes inputs and associated outputs. The evaluation data set input data may be input into the trained model. The model output is compared to the associated output data (i.e., the expected output if the model is accurate). The extent to which the model output matches the expected output is a measure of the model's accuracy.

Model selector 160 uses the accuracy scores for the trained models to identify the trained model that is the most accurate (Operation 255). The accuracy of the most accurate trained model is compared against an accuracy threshold to determine whether the most accurate trained model is accurate enough in an absolute sense (Operation 260). If the most accurate trained model is not accurate enough, then the model selector selects a default analytic model as the selected analytic model 190 (Operation 270). If the most accurate trained model is accurate enough, then the model selector selects the most accurate trained model as the selected analytic model 190. Data analysis system 195 may use the selected analytic model 190 for analyzing subsequently received data of target data set 180 (Operation 265).

The selected analytic model may be associated with an identifier. In an embodiment, the model identifier may be returned with the response to the request to select a model, and subsequent requests to the data analysis system to analyze a target data set may include the model identifier. Alternatively, the model identifier may be stored in association with information that links a target data set to the selected model. In an embodiment, a mapping may be created between (a) an identifier included in the request to select the model and (b) an identifier for the selected (and possibly trained) analytic model. In another embodiment, a request to analyze a target data set may include a set of attribute values corresponding the representative data. A combination of attribute values or a function of the attribute values may be mapped to the model identifier.

Figure 3:
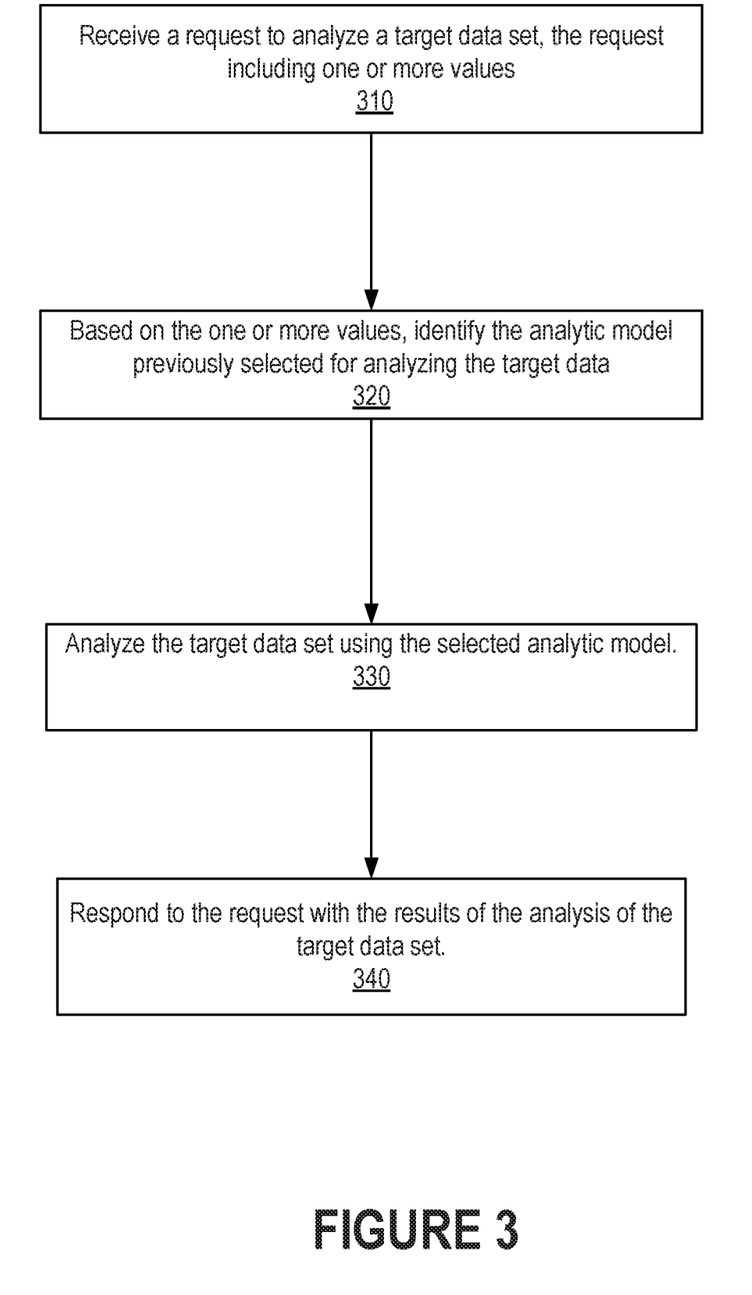
FIG. 3 is a flow diagram that illustrates using a preselected analytic model for analyzing a data set, in accordance with one or more embodiments.

FIG. 3 is a flow diagram that illustrates using a previously selected analytic model for analyzing a data set, in accordance with one or more embodiments. Operations described herein, with reference to FIG. 3, may be omitted, modified, or rearranged. Operations not illustrated in FIG. 3 may be performed instead of or in addition to the illustrated operations. Accordingly, the operations as described herein should not be construed to limit the scope of any of the claims.

Initially, the data analysis system receives a request to analyze a target data set (Operation 310). The system generating and sending a request for analysis may be pre-configured to generate a request for data analysis at certain configured times or at a certain interval. Data collected, but not yet analyzed, may be sent as target data in the request. In an embodiment, the target data may be sent to the data analysis system separate from the request for analysis.

The appropriate analytic model, having been previously selected using related representative data, is identified (Operation 320). The request to analyze a target data set may include a model identifier corresponding to the previously selected model. Alternatively, the request may include information that is stored in association with the selected model. As described above, information stored in association with a selected model may comprise an identifier (used to link the representative data with the target data) provided in the request to select a model.

In an embodiment, attributes of the target data set may be compared to attributes of representative data sets that have been used to select respective analytic models. If the attributes of the target data set and the attributes of a particular representative data set meet a similarity threshold, then an analytic model that was selected based on the particular representative data set may be selected for analyzing the target data set.

The selected analytic model is used to analyze the target data set (Operation 330). The data points in the target data set are input to the model. For example, the model may comprise one or more polynomial equations comprising a sum of terms, each term representing a type of input and having a coefficient determined when the model is trained. To determine the model output, the value of an input data point is plugged in as the value of the variable in the term corresponding to the type of input data. For example, if a model predicts the cost of a house based on input values for age, number of rooms, and roof height, the model may include an equation such as:

$$\text{Cost} = \text{Base Price} - X^*(\text{Age}) + Y^*(\text{number of rooms}) + Z^*(\text{roof height})$$

When the model is trained, the coefficients may be assigned values such as {"Base Price=100,000", "X=10" "Y=10,000, Z=0"}. The data set passed into the model may be {age, number of rooms, roof height} The output represents the expected cost of a house having the age, number of rooms and roof height indicated by the input values. In this example, only one value is output. However, in an embodiment, multiple sets of input data may be received, and multiple output values may be returned. In an embodiment, the input data may comprise time series data. The results of the analysis are returned to the requester (Operation 340).

FIG. 4 is a block diagram illustrating example relationships between machine learning models and unsuitable distribution types, in accordance with one or more embodiments. FIG. 4 illustrates 3 machine learning models: 410, 420, and 430. FIG. 4 also illustrates distribution types: 440, 450, and 460. Machine learning model 410 is connected to distribution type 440 to illustrate that machine learning model 410 is known to not perform well when the distribution of the representative data matches distribution type 440. Thus, when a request is received to select the best-performing analytic model for a set of representative data, machine learning model 410 may be a candidate model if the distribution of the representative data does not match distribution type 440. Machine learning model 420 is known to not perform well when the distribution of the representative data matches either or both distribution types 450 or 460. If the representative data set has a distribution that is similar to either distribution type 450 or distribution type 460, then machine learning model 420 may be removed from consideration and not be included in the candidate set of machine learning models. Machine learning model 430 may be selected for the candidate set of analytic models provided that the distribution of the representative data does not match distribution type 460. Data distributions that match distribution type 460 are not suitable for training both machine learning models 420 and 430. Thus, a representative data set having a distribution that matches distribution type 460 would not select machine learning models 420 or 430 as the selected analytic model.

4. EXAMPLE

Figure 5:
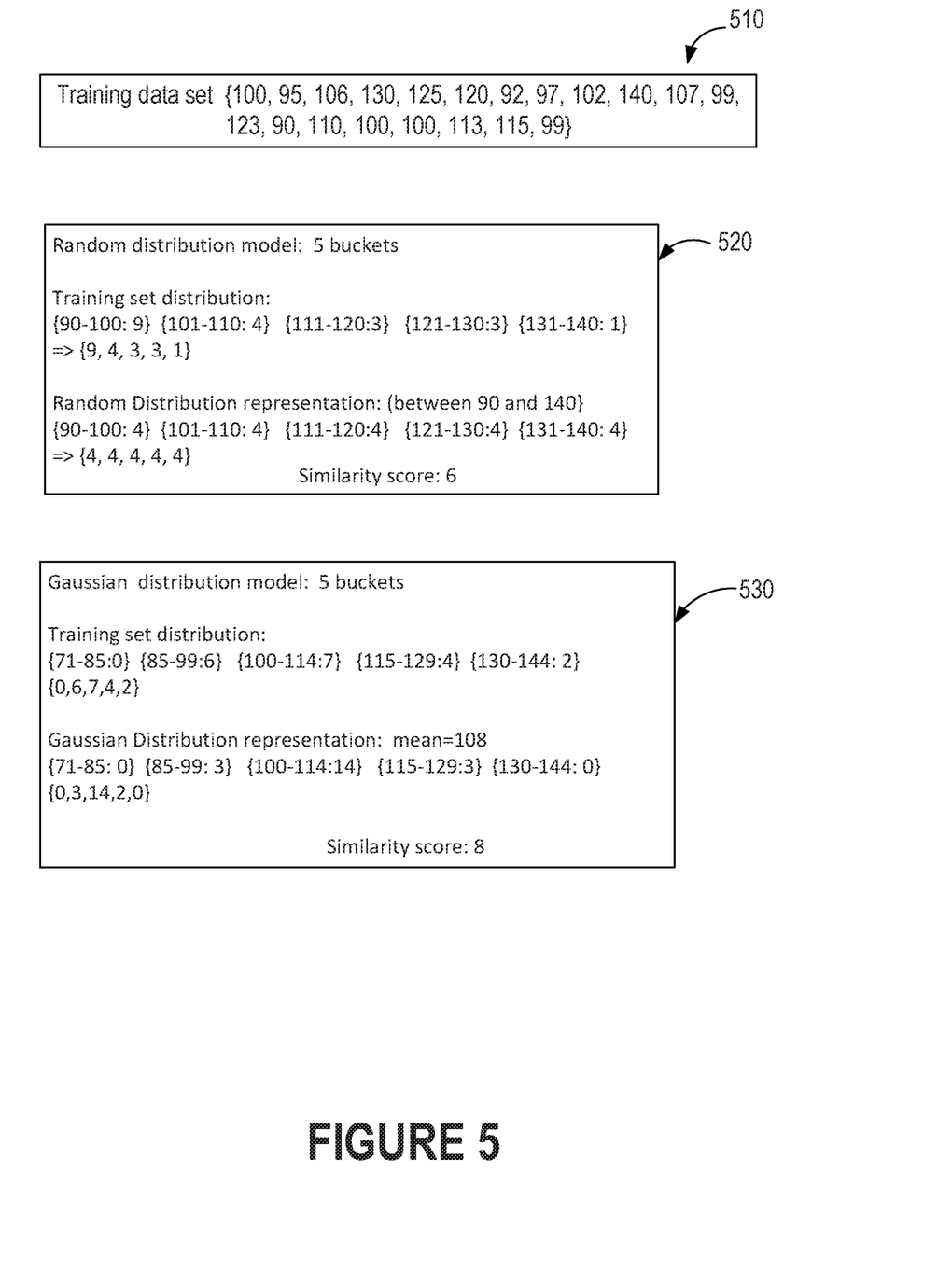
FIG. 5 illustrates determining matching distribution types for an example data set, in accordance with one or more embodiments.

FIG. 5 illustrates determining matching distribution types for a very small example data set for purposes of illustration. The example of FIG. 5 uses a representative data set 510 whose values include: {100, 95, 106, 130, 125, 120, 92, 97, 102, 140, 107, 99, 123, 90, 110, 100, 100, 113, 115, 99}. These values may be fasting glucose numbers that may be used to train a model to determine when one should see the doctor.

In block 520, the distribution of the representative data set is represented according to a random distribution. In this example, the random distribution partitions the data into 5 buckets with each bucket having approximately the same number of values in a range. For example in the random distribution representation, bucket 1 holds values from 90-100 and bucket 5 holds values 131-140. The low range of bucket 1 coincides with the lowest values in the representative data, and the high range of bucket 5 coincides with the highest value of the representative data. Then the ranges are evenly distributed across the buckets. The training set distribution in block 520 places each value of the representative data into one of the buckets defined by the random distribution. For example, 9 values (i.e. 100, 95, 92, 97, 99, 90, 100, 100, 99) of the representative data fall within the range of 90-100, and so 9 values are placed in the first bucket.

If the representative data were a perfect random distribution, the distribution representation would be {4, 4, 4, 4, 4}. To determine to what extent the actual distribution of the representative data set matches the random distribution, vectors {4,4,4,4,4} may be compared to {9, 4, 3, 3, 1} to determine how far apart the vectors are. A Euclidian distance function may be used to assess distance/similarity between the two vectors. A distance function outputs a score that represents the similarity of the two vectors. The similar score for the representative data set with a random distribution in this example is 6.

Block 530 illustrates determining the similarity of the same representative data set with a Gaussian distribution. Although the number of buckets could be different for this distribution, the example again uses 5 buckets, but the range of values for each bucket is different. The mean of the representative data values is 108 and the standard deviation is about 13.2. The range of values for each bucket is approximately 14. If the representative data were a perfect Gaussian distribution, the distribution representation would be close to {0,3,14,2,0}. Placing the actual representative data into the buckets defined by the Gaussian distribution model results in a distribution representation of {0,6,7,4,2} (for example, there are 7 representative data values in bucket 3 that holds ranges of values between 100 and 114). A similarity score of 8 is determined by computing the distance between {0,3,14,2,0} and {0,6,7,4,2}.

Using a similarity score based on a distance measure means that the representative data is closer to a random distribution with a similarity score of 6 than a gaussian distribution with a similarity score of 8. For illustrative purposes only, this example uses a similarity threshold of 4. That is, when the similarity score for a distribution type relative to a representative data set is less than or equal to 4, then the distribution matches. In this example, neither of the similarity scores 6 and 8 meet the threshold criteria, and thus, the representative data does not match either a random or a Gaussian distribution type. If the threshold were 7, then the representative data would match a random distribution because the random distribution similarity score of 6 is less than the threshold of 7. However, the representative data would not match a Gaussian distribution because the Gaussian distribution similarity score of 8 is not less than or equal to 7. If the threshold were 10, the representative data would match both a random and a Gaussian distribution. In the latest scenario, only machine learning models that can perform well using random and Gaussian distributions are candidates to be considered for the analytic model.

5. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
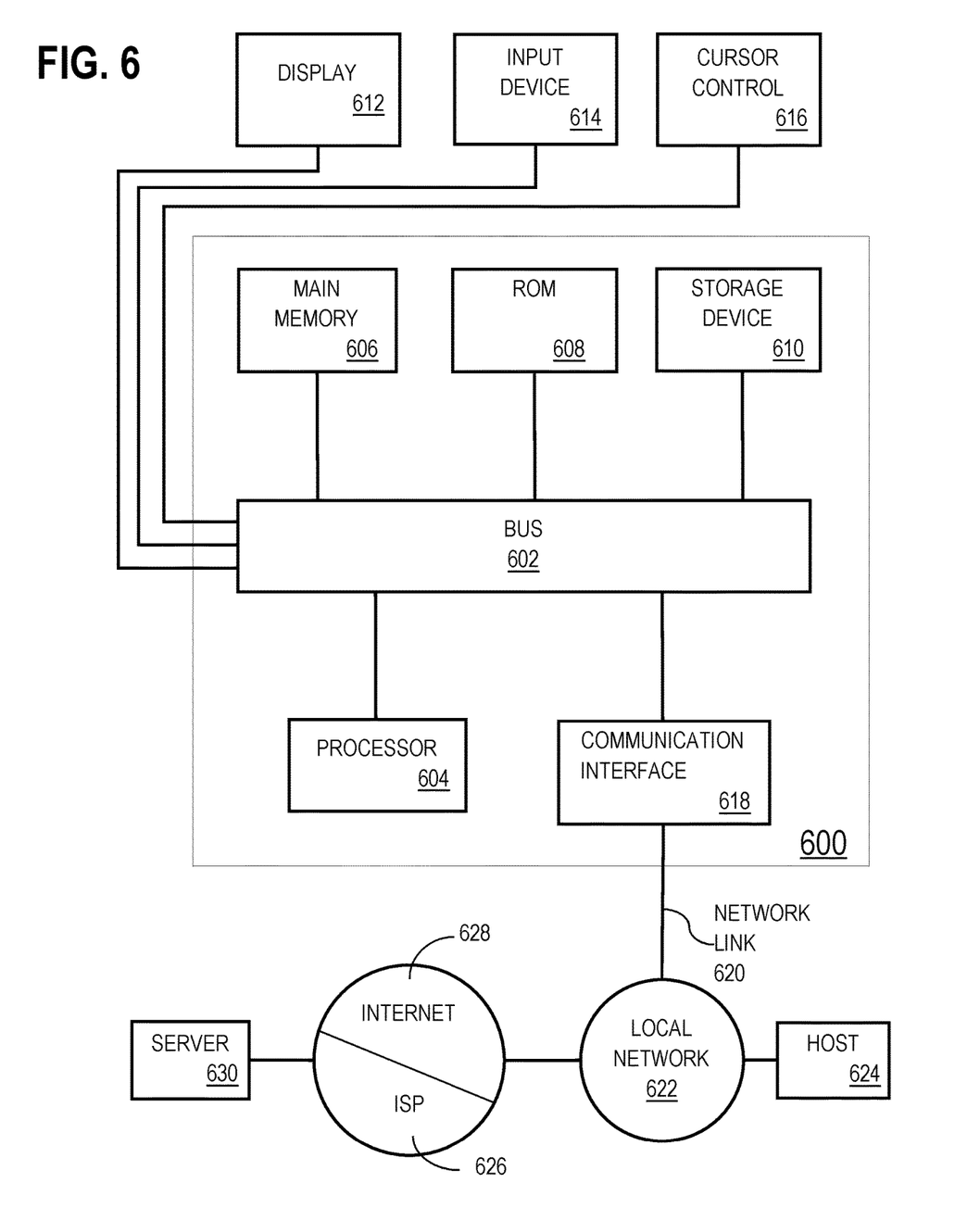
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:
   receiving a request to determine how to analyze a target data set corresponding to a set of attributes, the request identifying a first representative data set corresponding to the set of attributes of the target data set, wherein a first distribution of the first representative data set is of a first distribution type;
   obtaining a set of candidate machine learning models for analyzing the target data set;
   removing a first machine learning model from the set of candidate machine learning model for analyzing the target data set at least by:
      determining that the first machine learning model is suitable for a second distribution type;
      determining that the first distribution type, associated with the first representative data set, does not match the second distribution type; and
      responsive at least to determining (a) that the first machine learning model is suitable for the second distribution type and (b) that the first distribution type does not match the second distribution type:
         removing the first machine learning model from the set of candidate machine learning models for analyzing the target data set to generate a filtered set of candidate machine learning models;
   selecting a second machine learning model from the filtered set of candidate machine learning models for analyzing the target data set at least by:
      determining that the second machine learning model is unsuitable for the second distribution type;
   responsive at least to determining (a) that the second machine learning model is unsuitable for the second distribution type and (b) that the first distribution type does not match the second distribution type:
      selecting the second machine learning model for analyzing the target data set; and
   training, using at least a portion of the first representative data set, the second machine learning model to analyze the target data set,
   wherein determining that the first machine learning model is suitable for the second distribution type, comprises:
      computing a first similarity score between a third distribution type, associated with the first machine learning model, and the second distribution type; and
      based on the first similarity score, determining that third distribution type matches the second distribution type, and
   wherein determining that the second machine learning model is unsuitable for the second distribution type, comprises:
      computing a second similarity score between a fourth distribution type, associated with the second machine learning model, and the second distribution type; and
      based on the second similarity score, determining that the fourth distribution type does not match the second distribution type.

2. The media of claim 1, wherein the operations further comprise:
   responsive to receiving a request to analyze the target data set, analyzing the target data set using the trained second machine learning model.

3. The media of claim 1, wherein the second machine learning model is a default analysis model.

4. The media of claim 1, wherein the operations further comprise:
   subsequent to training the second machine learning model using the portion of the first representative data set, determining an accuracy score for the trained second machine learning model;
   wherein selecting the trained second machine learning model to analyze the target data set is further responsive to determining that the accuracy score for the trained second machine learning model meets an accuracy threshold.

5. The media of claim 1, wherein the operations further comprise:
   subsequent to training the second machine learning model using the portion of the first representative data set, determining an accuracy score for the trained second machine learning model;
   responsive at least to determining that the accuracy score of the trained second machine learning model does not meet an accuracy threshold, selecting a default analysis model, different than the second machine learning model, for analyzing the target data set.

6. The media of claim 1, the operations further comprise:
   selecting a third machine learning model that is unsuitable for the second distribution type;
   training, using at least the portion of the first representative data set, the third machine learning model using the target data set;
   determining a first accuracy score for the trained second machine learning model and a second accuracy score for the trained third machine learning model;
   wherein selecting the trained second machine learning model to analyze the target data set is further responsive to determining that:
      (a) the first accuracy score for trained second machine learning model is greater than the second accuracy score for the trained third machine learning model; and
      (b) the first accuracy score for the trained second machine learning model meets an accuracy threshold.

7. The media of claim 1, wherein computing the first similarity score comprises:
  generating a first vector corresponding to the second distribution type, the first vector comprising a first plurality of values, each value corresponding to a count of data points of the second distribution type that fall within a defined range of values;
  generating a second vector corresponding to the third distribution type, the second vector comprising a second plurality of values, each value corresponding to a count of data points of the third distribution type that fall within a defined range of values; and
  comparing the first vector to the second vector to compute the first similarity score.

8. A method comprising:
  receiving a request to determine how to analyze a target data set corresponding to a set of attributes, the request identifying a first representative data set corresponding to the set of attributes of the target data set, wherein a first distribution of the first representative data set is of a first distribution type;
  obtaining a set of candidate machine learning models for analyzing the target data set;
  removing a first machine learning model from the set of candidate machine learning model for analyzing the target data set at least by:
    determining that the first machine learning model is suitable for a second distribution type;
    determining that the first distribution type, associated with the first representative data set, does not match the second distribution type; and
    responsive at least to determining (a) that the first machine learning model is suitable for the second distribution type and (b) that the first distribution type does not match the second distribution type:
      removing the first machine learning model from the set of candidate machine learning models for analyzing the target data set to generate a filtered set of candidate machine learning models;
  selecting a second machine learning model from the filtered set of candidate machine learning models for analyzing the target data set at least by:
    determining that the second machine learning model is unsuitable for the second distribution type;
  responsive at least to determining (a) that the second machine learning model is unsuitable for the second distribution type and (b) that the first distribution type does not match the second distribution type:
    selecting the second machine learning model for analyzing the target data set; and
  training, using at least a portion of the first representative data set, the second machine learning model to analyze the target data set,
  wherein determining that the first machine learning model is suitable for the second distribution type, comprises:
    computing a first similarity score between a third distribution type, associated with the first machine learning model, and the second distribution type; and
    based on the first similarity score, determining that third distribution type matches the second distribution type, and
  wherein determining that the second machine learning model is unsuitable for the second distribution type, comprises:
    computing a second similarity score between a fourth distribution type, associated with the second machine learning model, and the second distribution type; and
    based on the second similarity score, determining that the fourth distribution type does not match the second distribution type.

9. The method of claim 8, the method further comprising:
  responsive to receiving a request to analyze the target data set, analyzing the target data set using the trained second machine learning model.

10. The method of claim 8, wherein the second machine learning model is a default analysis model.

11. The method of claim 8, the method further comprising:
  subsequent to training the second machine learning model using the portion of the first representative data set, determining an accuracy score for the trained second machine learning model;
  wherein selecting the trained second machine learning model to analyze the target data set is further responsive to determining that the accuracy score for the trained second machine learning model meets an accuracy threshold.

12. The method of claim 8, the method further comprising:
  subsequent to training the second machine learning model using the portion of the first representative data set, determining an accuracy score for the trained second machine learning model;
  responsive at least to determining that the accuracy score of the trained second machine learning model does not meet an accuracy threshold, selecting a default analysis model, different than the second machine learning model, for analyzing the target data set.

13. The method of claim 8, the method further comprising:
  selecting a third machine learning model that is unsuitable for the second distribution type;
  training, using at least another portion of the first representative data set, the third machine learning model using the target data set;
  determining a first accuracy score for the trained second machine learning model and a second accuracy score for the trained third machine learning model;
  wherein selecting the trained second machine learning model to analyze the target data set is further responsive to determining that:
    (a) the first accuracy score for trained second machine learning model is greater than the second accuracy score for the trained third machine learning model; and
    (b) the first accuracy score for the trained second machine learning model meets an accuracy threshold.

14. The method of claim 8, wherein computing the first similarity score comprises:
  generating a first vector corresponding to the second distribution type, the first vector comprising a first plurality of values, each value corresponding to a count of data points of the second distribution type that fall within a defined range of values;
  generating a second vector corresponding to the third distribution type, the second vector comprising a second plurality of values, each value corresponding to a count of data points of the third distribution type that fall within a defined range of values; and comparing the first vector to the second vector to compute the first similarity score.

15. A system comprising:

at least one device including a hardware processor;

the system configured to perform steps comprising:

receiving a request to determine how to analyze a target data set corresponding to a set of attributes, the request identifying a first representative data set corresponding to the set of attributes of the target data set, wherein a first distribution of the first representative data set is of a first distribution type;

obtaining a set of candidate machine learning models for analyzing the target data set;

removing a first machine learning model from the set of candidate machine learning model for analyzing the target data set at least by:

determining that the first machine learning model is suitable for a second distribution type;

determining that the first distribution type, associated with the first representative data set, does not match the second distribution type; and responsive at least to determining (a) that the first machine learning model is suitable for the second distribution type and (b) that the first distribution type does not match the second distribution type:

removing the first machine learning model from the set of candidate machine learning models for analyzing the target data set to generate a filtered set of candidate machine learning models;

selecting a second machine learning model from the filtered set of candidate machine learning models for analyzing the target data set at least by:

determining that the second machine learning model is unsuitable for the second distribution type;

responsive at least to determining (a) that the second machine learning model is unsuitable for the second distribution type and (b) that the first distribution type does not match the second distribution type:

selecting the second machine learning model for analyzing the target data set; and training, using at least a portion of the first representative data set, the second machine learning model to analyze the target data set, wherein determining that the first machine learning model is suitable for the second distribution type, comprises:

computing a first similarity score between a third distribution type, associated with the first machine learning model, and the second distribution type; and based on the first similarity score, determining that third distribution type matches the second distribution type, and wherein determining that the second machine learning model is unsuitable for the second distribution type, comprises:

computing a second similarity score between a fourth distribution type, associated with the second machine learning model, and the second distribution type; and based on the second similarity score, determining that the fourth distribution type does not match the second distribution type.

16. The system of claim 15, wherein computing the first similarity score comprises:

generating a first vector corresponding to the second distribution type, the first vector comprising a first plurality of values, each value corresponding to a count of data points of the second distribution type that fall within a defined range of values;

generating a second vector corresponding to the third distribution type, the second vector comprising a second plurality of values, each value corresponding to a count of data points of the third distribution type that fall within a defined range of values; and comparing the first vector to the second vector to compute the first similarity score.

* * * * *